No. 686,401. Patented Nov. 12, 1901.
A. J. GOODRICH.
DRINKING FOUNTAIN FOR STOCK OR POULTRY.
(Application filed July 15, 1901.)
(No Model.)
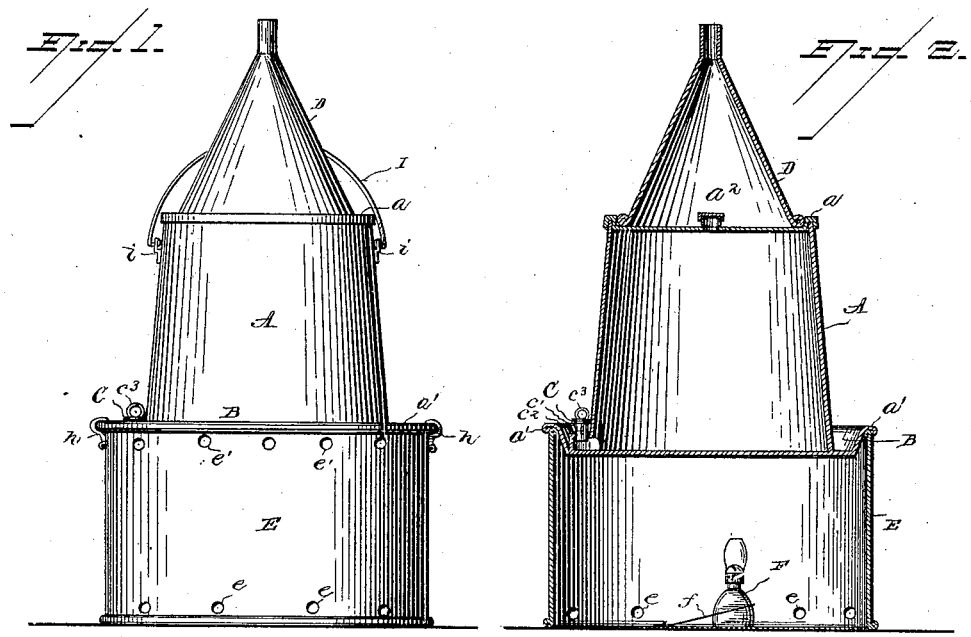
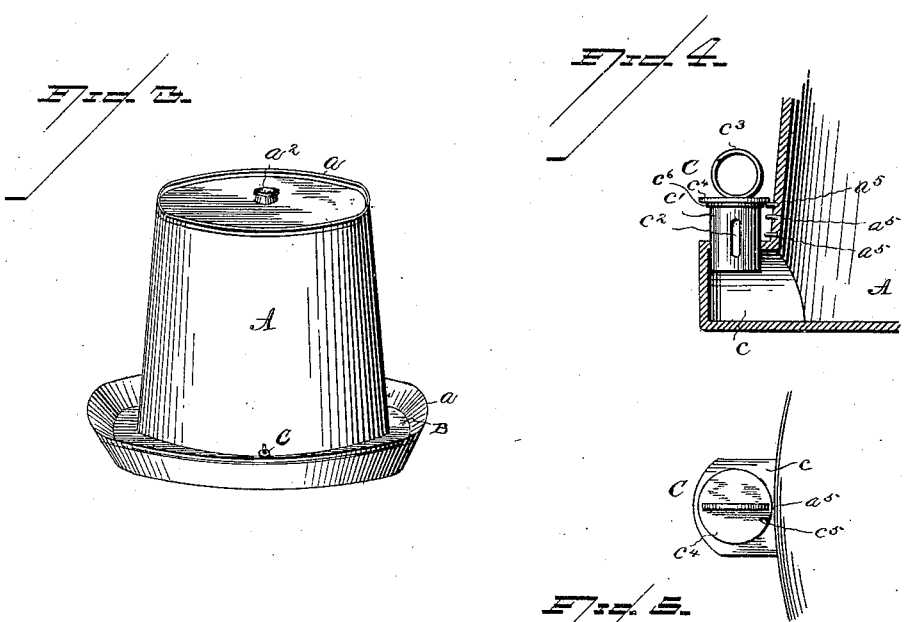

UNITED STATES PATENT OFFICE.

ANDREW J. GOODRICH, OF GRANDLEDGE, MICHIGAN.

DRINKING-FOUNTAIN FOR STOCK OR POULTRY.

SPECIFICATION forming part of Letters Patent No. 686,401, dated November 12, 1901.

Application filed July 15, 1901. Serial No. 68,398. (No model.)

*To all whom it may concern:*

Be it known that I, ANDREW J. GOODRICH, a citizen of the United States, and a resident of Grandledge, in the county of Eaton and State of Michigan, have invented certain new and useful Improvements in Drinking-Fountains for Poultry or Stock, of which the following is a full, clear, and exact specification.

The object of this invention is to provide a drinking-fountain or watering-tank for poultry and stock which will hold a considerable quantity of water and feed it to a trough surrounding the tank and in which the device is of such construction as to prevent chickens or other fowls from alighting upon it, whereby the water that is supplied to the poultry or stock will be kept fresh and free from dirt and litter.

A further object of the invention is to provide a watering-trough or fountain of this character with means for heating the water in cold weather to prevent freezing, and, furthermore, to provide the tank or reservoir with an outlet-valve that will facilitate the operation of filling the same with a supply of fresh water.

The invention consists in the particular construction and combination of parts, all as will be hereinafter fully described, and specifically set forth in the appended claims.

In the accompanying drawings, which form a part of this specification, and in which like letters of reference indicate like parts in the several views, Figure 1 is a side elevation of a drinking-fountain constructed in accordance with my invention. Fig. 2 is a vertical sectional view. Fig. 3 is a view showing the parts of the device which are used for watering chicks or young poultry. Figs. 4 and 5 are detail views of the valve.

Referring to said drawings, A designates a closed tank or reservoir, which is preferably frusto-conical, the said tank having a raised rim $a$ at its upper edge and at its lower edge is provided with an outwardly-inclined flange $a'$, the latter forming the watering-trough B, extending entirely around the tank or reservoir. In the top of the tank or reservoir is an opening by which it is filled, and this opening is closed by a screw-cap $a^2$.

Upon one side of the tank or reservoir A, at the lower end thereof, is an outlet-valve C, consisting of a tubular projection $c$, formed on the tank and adapted to receive a tube $c'$, closed at its upper end and provided with a slot $c^2$ in one side, the said tube being also provided with a handle or ring $c^3$, by which it is raised and lowered. The flange $c^4$ at the upper end of the tube engages one of the pins $a^5$ on the tank A to support said tube at the desired elevation, the lower pin holding the valve closed by engaging the upper side of the flange, the latter having a slot $c^5$, through which the pins pass. This valve discharges the water from the tank into the trough B, and the height of the slot determines the height of the water in the trough. A washer $c^6$ is located under the flange, as shown. In filling the tank with fresh water the valve C is closed and the water poured through the opening in the top, and after the tank or reservoir is filled the said opening is tightly closed by the screw-cap $a^2$. It will therefore be noted that my improved drinking-fountain relates to that class in which the tank or reservoir is filled through the top.

So much of the device as has been described—viz., the reservoir, trough, and valve—may be used in watering chicks or young poultry by resting the reservoir directly upon the ground, as illustrated in Fig. 3; but in order to provide a device of this character for general use in a poultry-yard for watering larger poultry I add thereto a funnel D, which is inverted and placed upon the top of the reservoir, and a pan E, which forms the base of the fountain and is adapted to receive a lamp for the purpose of heating the water in cold weather. The inverted funnel presents a conical top for the device, which will prevent the fowls from standing upon the top and depositing dirt and filth into the trough. The pan or base portion E is of such size as to receive the tank and trough, the outer edge of the latter resting upon the upper edge of said pan in order that the entire under surface of the fountain proper will be heated by the lamp. The pan or base portion is provided with holes $e$ and $e'$ for the passage of air to and from the lamp, the outlet-holes $e'$ being directly under the trough. The outer edge of the trough is reinforced by a wire. In the bottom of the pan is attached a wire loop $f$, which is adapted to secure the lamp F in place, and at the upper end of said pan are attached spring-hooks $h$, which engage the trough and hold the reservoir securely upon the pan or base portion of the device.

The tank or reservoir is provided with a bail or handle I, attached to ears $i$, secured to the sides of the tank, and this bail provides the means for carrying the fountain from place to place.

As the device is intended to be used in a poultry and stock yard and exposed to the weather, the several parts, exclusive of the lamp, are preferably made of galvanized metal; but of course I do not limit my protection to this material, as the reservoir and possibly the other parts may be made of stoneware.

It will be seen that by the construction and arrangement of parts constituting my improved drinking-fountain, as herein shown and described, I provide a device of this character which is simple, can be conveniently filled, and in use will present a neat appearance. With the base portion and funnel applied there is no chance of poultry alighting upon the device, which will not only keep the top clean, but will also protect the trough from dirt and filth.

It will be understood, of course, that the funnel is used in filling the reservoir by introducing the reduced end thereof into the hole in the top, so that the said funnel not only serves the purpose of giving a conical top to the fountain, but also may be used for filling the reservoir with water.

The parts are all firmly connected and being provided with a wide base the device is not liable to be upset.

Having thus described my invention, what I claim as new, and desire to secure by Letters Patent, is—

1. In a drinking-fountain for poultry and stock, the combination, of the reservoir or closed tank, a trough at the lower edge thereof, a tubular projection at one side of the tank and communicating therewith, and a slotted tube working in said tubular projection, substantially as shown, the reservoir having a filling-opening in its top and a screw-cap for closing said opening, for the purpose set forth.

2. In a drinking-fountain for poultry and stock, the combination, of the reservoir or closed tank, a trough at the lower edge thereof, a tubular projection at one side of the reservoir and communicating therewith, a slotted tube working in said projection, a projecting flange on said tube having a recess at its edge, and pins projecting from the reservoir and adapted to engage the flange of the tube, substantially as shown, the reservoir having a filling-opening in its top and a cap for closing said opening.

In testimony whereof I affix my signature in the presence of two witnesses.

ANDREW J. GOODRICH.

Witnesses:
V. L. SULLIVAN,
JUSTIN L. SUTHERLAND.